US009565209B1

(12) United States Patent
Grzonkowski et al.

(10) Patent No.: US 9,565,209 B1
(45) Date of Patent: Feb. 7, 2017

(54) DETECTING ELECTRONIC MESSAGING THREATS BY USING METRIC TREES AND SIMILARITY HASHES

(71) Applicant: Symantec Corporation, Mountain View, CA (US)

(72) Inventors: Slawomir Grzonkowski, Dublin (IE); Alejandro Mosquera Lopez, Reading (GB); Dylan Morss, Pleasant Hill, CA (US); Lamine Aouad, Dublin (IE)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/675,545

(22) Filed: Mar. 31, 2015

(51) Int. Cl.
 *H04L 29/06* (2006.01)
 *H04L 12/58* (2006.01)
 *G06F 17/30* (2006.01)
 *G06F 21/56* (2013.01)

(52) U.S. Cl.
 CPC ....... *H04L 63/145* (2013.01); *G06F 17/30109* (2013.01); *G06F 21/562* (2013.01); *H04L 51/046* (2013.01); *H04L 51/12* (2013.01)

(58) Field of Classification Search
 CPC . H04L 63/145; G06F 17/30109; G06F 21/562
 See application file for complete search history.

(56) References Cited

U.S. PATENT DOCUMENTS

| 7,660,865 | B2 | 2/2010 | Hulten et al. |
| 7,979,082 | B2 | 7/2011 | Dholakia et al. |
| 8,489,689 | B1 | 7/2013 | Sharma et al. |
| 2004/0236761 | A1* | 11/2004 | Both ................. G06F 17/30097 |
| 2005/0262210 | A1* | 11/2005 | Yu ........................... H04L 51/12 709/206 |
| 2012/0215853 | A1* | 8/2012 | Sundaram ............. H04L 63/126 709/206 |

OTHER PUBLICATIONS

Wei Lu, Xiaoyong Du, Marios Hadjieleftheriou, Beng Chin Ooi, Efficiently Supporting Edit Distance based String Similarity Search Using B+ -trees, Feb. 2015.*

(Continued)

*Primary Examiner* — Carl Colin
*Assistant Examiner* — Vance Little
(74) *Attorney, Agent, or Firm* — Patent Law Works LLP

(57) ABSTRACT

Each node of a metric tree comprises a similarity hash of a member of a dataset of known message threats, calculated using a given similarity hashing algorithm. The nodes are organized into the tree, positioned such that the differences between the similarity hashes are represented as distances between the nodes. Messages are received and tested to determine whether they are malicious. When a message is received, a similarity hash of the message is calculated using the same similarity hashing algorithm that is used to calculate the hashes of the members of the dataset. The tree is searched for a hash of a known message threat that is within a threshold of distance to the hash of the received message. Searching the tree can take the form of traversal from the root node, to determine whether the tree contains a node within the similarity threshold.

20 Claims, 4 Drawing Sheets

(56) References Cited

OTHER PUBLICATIONS

Uhlmann, Jeffrey, "Satisfying General Proximity/Similarity Queries with Metric Trees." Information Processing Letters 40(4), 1991, pp. 175-179 (5 pages).

Brin, Sergey, "Near Neighbor Search in Large Metric Spaces." 21$^{st}$ International Conference on Very Large Data Bases (VLDB), 1995, pp. 574-584 (10 pages).

Ho, Phuc-Tran et al., "Application of Sim-Hash Algorighm and Big Data Analysis in Spam Email Detection System." Proceedings of the 2014 Conference on Research in Adaptive and Convergent Systems, 2014, pp. 242-246 (5 pages).

* cited by examiner

DETECTING ELECTRONIC MESSAGING THREATS BY USING METRIC TREES AND SIMILARITY HASHES

TECHNICAL FIELD

This disclosure pertains generally to computer security, and more specifically to detecting electronic messaging threats by using metric trees and similarity hashes.

BACKGROUND

Electronic messaging, both in the forms of email and text messages, is an extensively used and convenient communication mechanism. Unfortunately, electronic messaging is widely used to disseminate spam, attempted phishing scams, malware and other threats. Such message based threats range from unwanted advertising material, to pornographic material, to attempts to get users to click on links or send text messages to phone numbers in attempts to scam the user into entering personal or financial information, or to infect the user's computer or smartphone with malware. Many utilities exist that attempt to filter out message threats before they reach the user's inbox.

Conventional messaging threat detection examines messages for specific features indicative of threats, such as certain keywords commonly used in spam, specific links or phones numbers known to be used by scammers, or cryptographic (e.g., md5, sha2) hashes of messages. Conventional message filtering technology typically focuses on two main approaches: 1) to look for an exact text match of some keyword or preselected feature; and 2) to apply regular expressions for known spam templates. To evade such detection, attackers may change or intentionally misspell the filtered keywords, or change the domain and/or phone number used. Surprisingly, these small variations are often sufficient to evade conventional detection.

For example, one filtering technique is to scan messages for a specific URL or phone number that is known to be used in spam or other message threats. Such a URL or phone number is often called a CTA (Call-to-Action), because the receiver of the message is encouraged to take an action (e.g., click the link or text/call the number). CTA-based filtering can fail to detect message threats where the URL on which the user is encouraged to click is modified slightly, for example by using a shortening service such as Bitly. Furthermore, CTA-based scanning fails to take into account the context of the message. For example, the same domain might appear in both benign and malicious messages, resulting in either false positives or false negatives depending upon how the domain is classified.

In the case of regular expression based detection, an analyst writes a regular expression for a known spam template. In other cases, the regular expression is automatically generated by a script or the like. In either case, the regular expression might be prone to errors. Furthermore, small changes of the text in question such as intentional typos or misspellings often evade this type of detection. When such minor changes have been detected, updates to the previously provided regular expressions must be created and distributed.

Switching topics, similarity hashing functions ensure that similar inputs result in similar hashes. A known property of similarity hashes is that similar messages have similar, but not exact, hashes. For example, using the algorithm called simhash to calculate a hash of the text "Some spam message a" would result in a hash of value 0x5d5eaa672f24cc0c, whereas calculating a hash of the similar message "Some spam message b" would result in a hash value of 0x5d5eaa632a66cc04. Such small modifications to content are common in message threats, for example when spammers use URL shortening services or intentionally misspell words.

A serious difficulty arises when trying to apply simhash to detect message threats. More specifically, even if a message being evaluated produces a similar hash to that of a known threat, it is still challenging to find the similar hash in a dataset of hashes of known message threats. This is so because small changes of the message content affect both the least significant bits and the most significant bits of the resulting hash. Thus, simply sorting a dataset of hashes of known message threats would not result in a meaningful, ordered organization. For this reason, when attempting to determine if there exists a hash in the dataset that matches or is within a given threshold of similarity to a hash of a message being evaluated, binary search and other known efficient approaches for locating members of ordered sets would not be usable. Instead, because minor variations in the input affect the least and most significant bits, a simhash of a given threat candidate conventionally needs to be compared to each simhash in the dataset of confirmed message threats, using pairwise comparisons, until a hit meeting a predetermined similarity threshold is found, or the set of simhashes of confirmed threats is exhausted. This is very computationally expensive, and the number of required pairwise comparisons grows proportionally as the number of simhashes of known message threats increases. Such an approach is simply not practical for any large dataset.

It would be desirable to address these issues.

SUMMARY

A metric tree is built and maintained. Each node of the metric comprises a similarity hash value of a member of a dataset of known electronic message threats, calculated using a given similarity hashing algorithm. The nodes are organized into the metric tree, positioned such that the differences between the similarity hash values are represented as distances between the nodes.

Electronic messages are received and tested to determine whether they are malicious or benign (e.g., spam or ham). When a message is received, a similarity hash value of the message is calculated using the same similarity hashing algorithm that is used to calculate the similarity hash values of the members of the dataset. The metric tree is searched for a similarity hash value of a known electronic message threat that is within a predetermined threshold of distance to the similarity hash value of the received message. Searching the metric tree for a similarity match can take the form of traversing the tree starting at its root node, to determine whether the tree contains a specific node within the predetermined similarity threshold.

The received message is adjudicated as being benign or malicious, responsive to results of the searching. More specifically, the message can be adjudicated as being malicious, responsive to finding a similarity hash value in the metric tree within the predetermined threshold of distance, meaning that the received message is sufficiently similar to a known threat. If a sufficiently similar hash value is not found in the tree, the received message can be adjudicated as benign.

In one embodiment, multiple metric trees are created and maintained, wherein each different metric tree contains similarity hash values of the members of the dataset calculated using a different similarity hashing algorithm. Similarity hashes of received messages are then calculated using each similarity hashing algorithm. Each tree is searched for a similarity match for the hash value calculated using that tree's similarity hashing algorithm. The results of searching the multiple trees can be used to fine-tune the adjudication, and cut down on false positive and false negatives.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
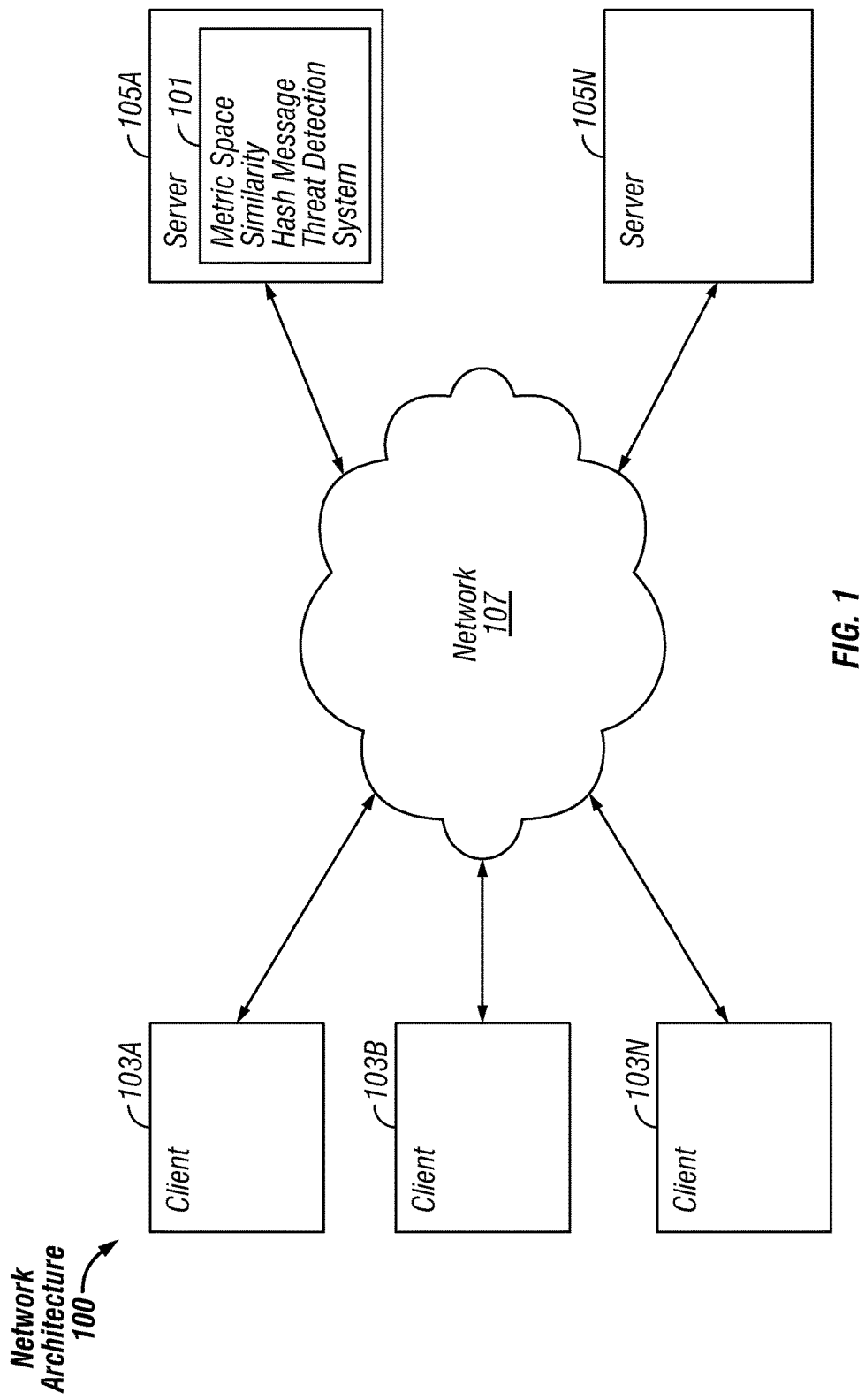
FIG. 1 is a block diagram of an exemplary network architecture in which a metric space similarity hash message threat detection system can be implemented, according to some embodiments.

FIG. 1 is a block diagram illustrating an exemplary network architecture 100 in which a metric space similarity hash message threat detection system 101 can be implemented. The illustrated network architecture 100 comprises multiple clients 103A, 103B and 103N, as well as multiple servers 105A and 105N. In FIG. 1, the metric space similarity hash message threat detection system 101 is illustrated as residing on server 105A. It is to be understood that this is an example only, and in various embodiments various functionalities of this system 101 can be instantiated on a client 103, a server 105, or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown). Clients 103 can but need not be in the form of mobile computing devices, comprising portable computer systems 210 capable of connecting to a network 107 and running applications. Such mobile computing devices are sometimes referred to as smartphones, although many mobile phones not so designated also have these capabilities. Tablet computers and laptop computers are other examples of mobile computing devices.

Although FIG. 1 illustrates three clients 103 and two servers 105 as an example, in practice many more (or fewer) clients 103 and/or servers 105 can be deployed. In one embodiment, the network 107 is in the form of the Internet. Other networks 107 or network-based environments can be used in other embodiments.

Figure 2:
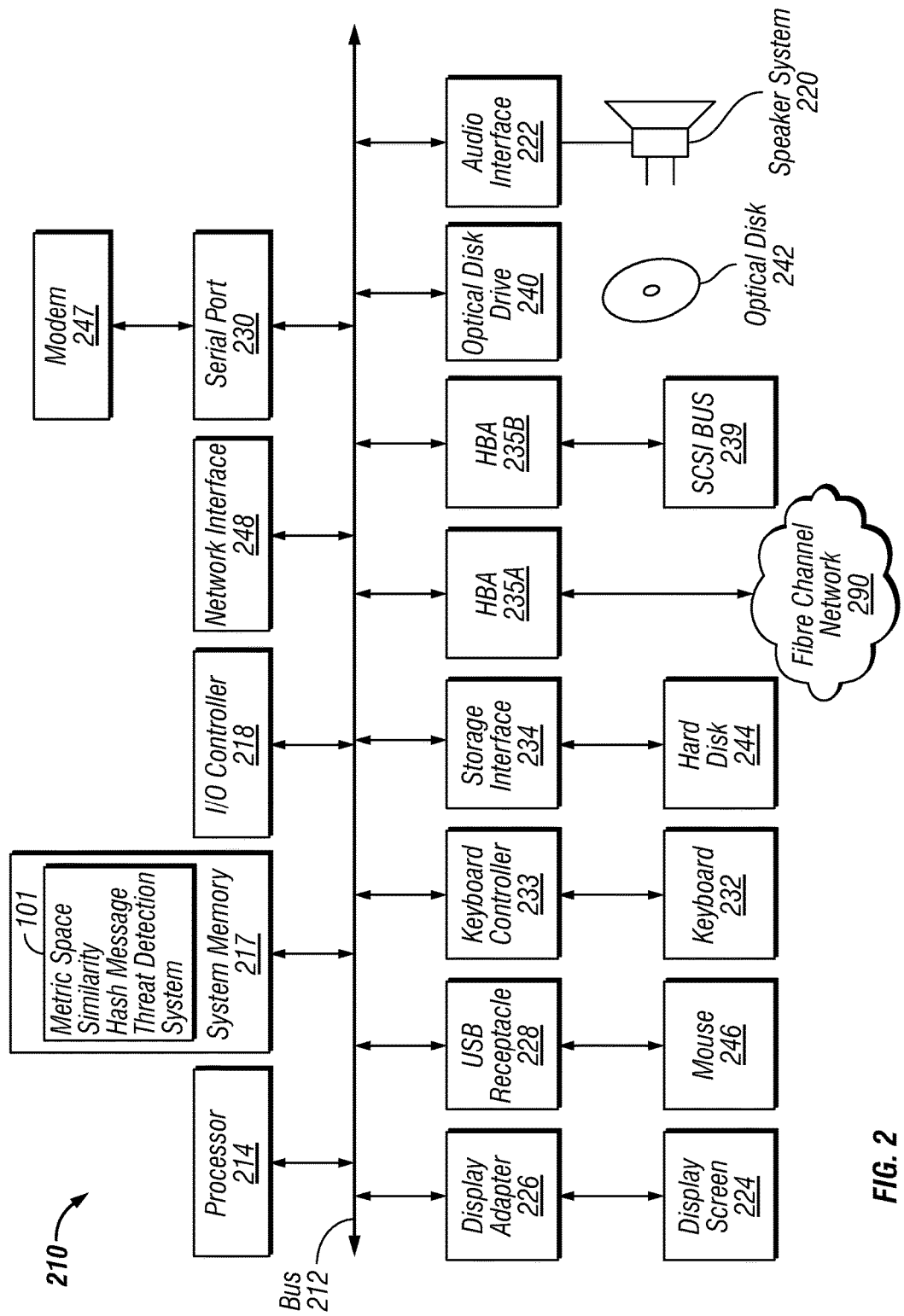
FIG. 2 is a block diagram of a computer system suitable for implementing a metric space similarity hash message threat detection system, according to some embodiments.

FIG. 2 is a block diagram of a computer system 210 suitable for implementing a metric space similarity hash message threat detection system 101. Clients 103 and servers 105 can all be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory, an input/output (I/O) controller 218, an audio output interface 222 communicatively coupled to an audio output device such as a speaker 220, a display adapter 226 communicatively coupled to a video output device such as a display screen 224, one or more interfaces such as Universal Serial Bus (USB) ports 228, serial ports 230, parallel ports (not illustrated), etc., a keyboard controller 233 communicatively coupled to a keyboard 232, a storage interface 234 communicatively coupled to one or more hard disk(s) 244 (or other form(s) of storage media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212, e.g., via a USB port 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices via, e.g., USB ports 228). In different embodiments the various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242, flash memory) and loaded into system memory 217 and executed by the processor 214. Application programs can also be loaded into system memory 217 from a remote location (i.e., a remotely located computer system 210), for example via the network interface 248. In FIG. 2, the metric space similarity hash message threat detection system 101 is illustrated as residing in system memory 217. The workings of the metric space similarity hash message threat detection system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and/or modem 247 can be directly or indirectly communicatively coupled to a network 107 such as the internet. Such coupling can be wired or wireless.

Figure 3:
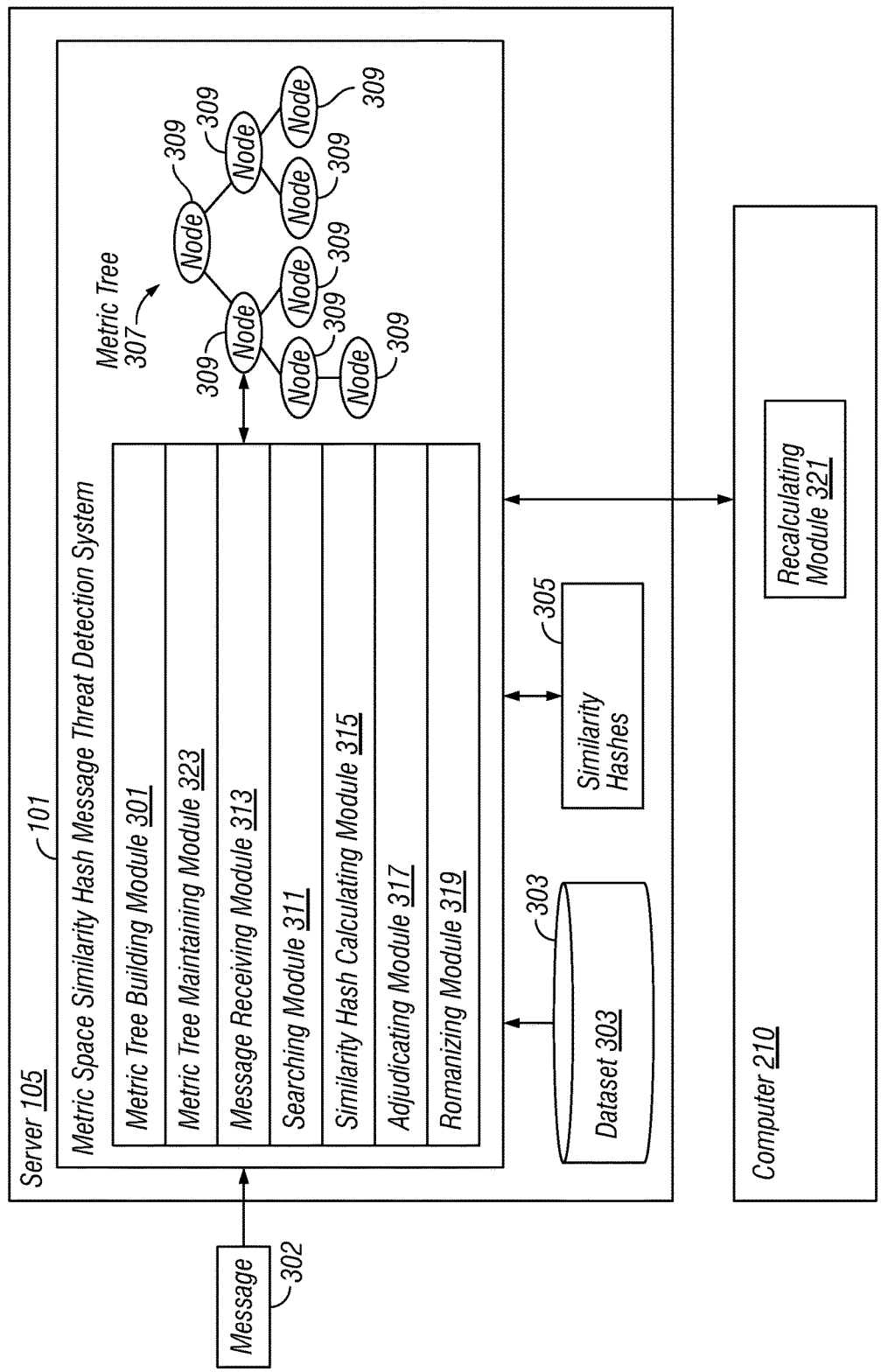
FIG. 3 is a high level block diagram of the operation of a metric space similarity hash message threat detection system, according to some embodiments.

FIG. 3 illustrates the operation of a metric space similarity hash message threat detection system 101 running on a server 105. As described above, the functionalities of the metric space similarity hash message threat detection system 101 can reside on specific computers 210 or be otherwise distributed between multiple computer systems 210, including within a fabric/cloud-based computing environment in which the functionality of the metric space similarity hash message threat detection system 101 is provided as a service over a network 107. It is to be understood that although the metric space similarity hash message threat detection system 101 is illustrated in FIG. 3 as a single entity, the illustrated metric space similarity hash message threat detection system 101 represents a collection of functionalities, which can be instantiated as a single or multiple modules as desired (instantiation of a specific, multiple module metric space similarity hash message threat detection system 101 is illustrated in FIG. 3). It is to be understood that the modules of the metric space similarity hash message threat detection system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client computer," "server computer" and "computing device" mean one or more computers configured and/or programmed to execute the described functionality. Additionally, program code to implement the functionalities of the metric space similarity hash message threat detection system 101 can be stored on computer-readable storage media. Any form of tangible computer readable storage medium can be used in this context, such as magnetic, optical or solid state storage media. As used herein, the term "computer readable storage medium" does not mean an electrical signal separate from an underlying physical medium.

As illustrated in FIG. 3, a metric tree building module 301 of the metric space similarity hash message threat detection system 101 builds a metric tree 307 (or other metric data structure) containing the members of the dataset 303 of similarity hashes 305 of known message threats (e.g., known spam messages, phishing emails, etc.). For purposes of explanation of the operation of the metric space similarity hash message threat detection system 101, Table 1 depicts the text of sample known message threats, with varying amounts of change from base patterns, and the resulting similarity hashes 305 in hexadecimal. Although Table 1 only depicts eight members for purposes of explanation, it is to be understand that in practice datasets 303 of similarity hashes 305 of know message threats typically contain many more members (e.g., hundreds, thousands, tens of thousands, etc.).

TABLE 1

| Sample Threat Message | Hex. Similarity Hash | Notes |
| --- | --- | --- |
| Examples with minimal changes, e.g., URL shortener | | |
| "Visit my webpage: http://shorener.com/123a to receive a free tablet" | b477393390c8ebb8 | Base pattern |
| "Visit my webpage: http://shorener.com/123b to receive a free tablet" | 1477393398c8e3ba | 4 characters difference |
| "Visit my webpage: http://shorener.com/500z to receive a free tablet" | bc75393313c0c1ba | 8 characters difference |
| Significant changes, sequence of words and call-to-action are modified | | |
| 'Your CREDIT CARD #1234 has been temporarily DEACTIVATED. Please call SECURE BANK 24 hrs line at (123) 456-789' | 41efaba592f8669e | Base pattern |
| 'First BANK ALERT: Your CARD has been temporarily-DEACTIVATED. Please call our Card services 24 hrs line (123) 456-999' | 93efb9a75aa8369a | 9 characters difference |
| The first part of messages is similar, the rest differs much more | | |
| 'Approved to claim ATM CARD of $2,000,000.00 contact Mrs Kate tel: +123456789.Email: kate@malicious.com' | df3f19eb6ad2c079 | Base pattern |
| 'Approved to claim ATM CARD of $2,000,000.00 for details contact. Kate tel: 00123456789. Email: kate@malicious.com' | 9b1f11eb6af2c079 | 5 characters difference |
| 'Download my application from https://some-repository-dot-com' | 38b4171f41161db8 | Base pattern |

As explained above, a dataset 303 of similarity hashes 305 cannot be conventionally sorted or ordered such that individual hashes 305 can be quickly located using conventional techniques such as a binary search. For this reason, the metric space similarity hash message threat detection system 101 uses metric data structures to store the dataset 303, and to access individual similarity hashes 305 therein in an efficient manner.

A metric space is a set for which distances between all members are defined. For example, any two or three dimensional Euclidean space is a metric space, in which the set consists of all points, and the distance between any two points is defined as the length of the straight line segment between them. Other metrics spaces occur in non-Euclidean geometries. In any case, the defined distances between the members are called a metric on the set. Mathematically, a metric space is an ordered pair (M, d), where M is a set and d is a metric on M (i.e., d is the distance function for M).

According to the mathematical concept of triangle inequality, for any triangle on a Euclidian plane, the sum of the lengths of any two sides are greater than or equal to the length of the remaining side. If x, y and z are the lengths of the three sides of a triangle, triangle inequality can be expressed as $z<=x+y$, which is true for any x, y and z. Because a triangle exists in a metric space (a Euclidean plane), triangle inequality holds true for any x, y, z that are members of any metric space M (x, y, z∈M). As a mathematical property of distances, triangle inequality can be expressed as $d(x,z)<=d(x,y)+d(y,z)$.

Using the concepts of metric space and triangle inequality, a metric tree maintaining module 323 of the metric space similarity hash message threat detection system 101 utilizes a metric data structure such as a metric tree 307 to maintain a usefully ordered dataset 303 consisting of the similarity hashes 305 of known message threats. The multiple similarity hashes 305 are treated as members of the set M, and the differences between similarity hashes 305 are treated as distances between the members. The similarity hashes 305 are stored as nodes 309 of the metric tree 307 (or other metric data structure), with differences between similarity hashes 305 represented as distances between the nodes 309. In different embodiments, different specific types of metric trees 307 are used, such as an M-tree, a vantage point (VP) tree, a cover tree, a BK tree, etc.

In one embodiment, similarity hashes 305 in this context are in the form of binary values, which allows more precise distance calculations than hexadecimal values, and thus increases the entropy of the results. Table 2 shows the same set of messages as Table 1, with similarity hash values 305 expressed in binary as opposed to hexadecimal. Table 2 also shows the resulting distances in bits between the binary similarity hashes 305 of various messages and their corresponding bases.

median value of the distances of the remaining nodes 309 from the base (i.e., from root node 309). Using the principal of triangle inequality, each remaining similarity hash value 305 with a distance to the base that is less than or equal to the median is placed on a left branch of the tree 307 from the root node 309, and those with a distance greater than the median are placed on a right branch. For each branch, a member is selected randomly to be the base, and that node's edit distance is calculated as the median distance of the remaining nodes 309 in that branch. The remaining nodes 309 of the branch are then placed to the left or right of the base, as appropriate. This process is repeated recursively until each member of the set (each similarity hash value 305) is assigned to a node 309 at a specific position in the metric tree 307.

A specific example of building a metric tree 307 is described to aid understanding. Referring to the example known threat messages depicted in Table 2, the similarity hashes 305 of messages A-H comprise the members of the

TABLE 2

| | Sample Threat Message | Binary Similarity Hash | Distance in Bits |
|---|---|---|---|
| | *Examples with minimal changes URL e.g., URL shortener* | | |
| A | "Visit my webpage: http://shorener.com/123a to receive a free tablet" | 1011010001110111001100100110011100100001100100011101011101111000 | Base |
| B | "Visit my webpage: http://shorener.com/123b to receive a free tablet" | 0001010001110111001100100110011100110001100100011100011101111010 | 5 |
| C | "Visit my webpage: http://shorener.com/500z to receive a free tablet" | 1011110001110101001100100110011001000100111000000011000001101111010 | 10 |
| | *Significant changes sequence of words and call to action are modified* | | |
| D | 'Your CREDIT CARD #1234 has been temporarily DEACTIVATED. Please call SECURE BANK 24hrs line at (123) 456-789' | 01000001111011111010101110100101100100101111100001100110100111110 | 20 |
| E | 'First BANK ALERT: Your CARD has been temporarily-DEACTIVATED. Please call our Card services 24 hrs line (123) 456-999' | 10010011111011111011100110100111010110101010000011011010011010 | 19 |
| | *The first part of messages is similar, the rest differs much more* | | |
| F | 'Approved to claim ATM CARD of $2,000,000.00 contact Mrs Kate tel:+123456789.Email:kate@malicious.com' | 11011111001111110001100111101011011010101101001011000000001111001 | 21 |
| G | 'Approved to claim ATM CARD of $2,000,000.00 for details contact.Kate tel:00123456789.Email:kate@malicious.com' | 10011011000111110001000111101011011010101111001011000000001111001 | 23 |
| H | 'Download my application from https://some-repository-dot-com' | 001110001011010000010111000111110010000100010110000111011011000 | 19 |

In order to build a metric tree 307 containing the similarity hashes 305 of known message threats, the metric tree building module 301 represents each member of the dataset 303 (the similarity hashes 305 of the various known message threats) as a node 309. The metric tree building module 301 randomly selects a specific member as the base, and that member becomes the root node 309 of the metric tree 307. The edit distance to the root node 309 is calculated as the dataset 303 to be represented by the nodes 309 of a metric tree 307. In this example, set member A is randomly chosen as the base, and thus becomes the root node 309 of the metric tree 307. The median value of the distances of each other similarity hash value 305 from the base is then calculated. In this example, these distances (measured in bits) are 5 (set member B), 10 (set member C), 19 (set member E), 19 (set member H), (set member D), 21 (set member F) and 23 (set member G), so the median is 19. Therefore, 19 is set as the edit distance to the root node 309. Each remaining hash value 305 with a distance to the base that is less than or equal to the median value of 19 is placed on a left branch from the root node 309. In the current example these are members B, C, E and H, with distances of 5, 10, 19 and 19 respectively. Those hash values 305 with a distance greater than the median are placed on a right branch, which in this example are D, F and G, with distances of 20, 21 and 23. Referring now to the left branch, a member is randomly chosen to be the base, and that hash value 305 becomes the level 2 node 309 of the left branch of the metric tree 307. In this example, member H is chosen. The distances of remaining left branch values B, C and E are 21, and 23, resulting in a median value of 21. The edit distance to H is thus set to 21, and B and C, with distance values equal to the median go to the left of H, and E, with a distance value greater than the median, goes to the right. At level three of the metric tree 307, on the left branch from H, we now have nodes B and C. In the current example C is randomly chosen as the base. The distance of B from C is 11, so 11 becomes the edit distance to C, and B becomes a childless leaf node 309 of C at the fourth level of the metric tree 307. On the right branch from node H, the only remaining node is E, which becomes a childless leaf node 309 of H at the third level of the metric tree 307.

Turning our attention to the right branch from the root, as noted above we have nodes D, F and G. In our example G is randomly chosen as the base, leaving D and F, with respective distance from G of 19 and 5. Setting the edit distance to G as 5, F and D become the left and right childless leaf nodes 309 of G at level three.

In this example in which the random selection of successive base nodes 309 is (from left to right, then top to bottom) H, G and then C, the distance calculations are summarized below in Table 3:

TABLE 3

|   | A | B | C | D | E | F | G | H |
|---|---|---|---|---|---|---|---|---|
| A | 0 | 5 | 10 | 20 | 19 | 21 | 23 | 19 |
| B |   |   |   |   |   |   |   |   |
| C |   | 11 | 0 |   |   |   |   |   |
| D |   |   |   |   |   |   |   |   |
| E |   |   |   |   |   |   |   |   |
| F |   |   |   |   |   |   |   |   |
| G |   |   |   | 19 |   | 5 | 0 |   |
| H |   | 21 | 21 |   | 23 |   |   | 0 |

Figure 4:
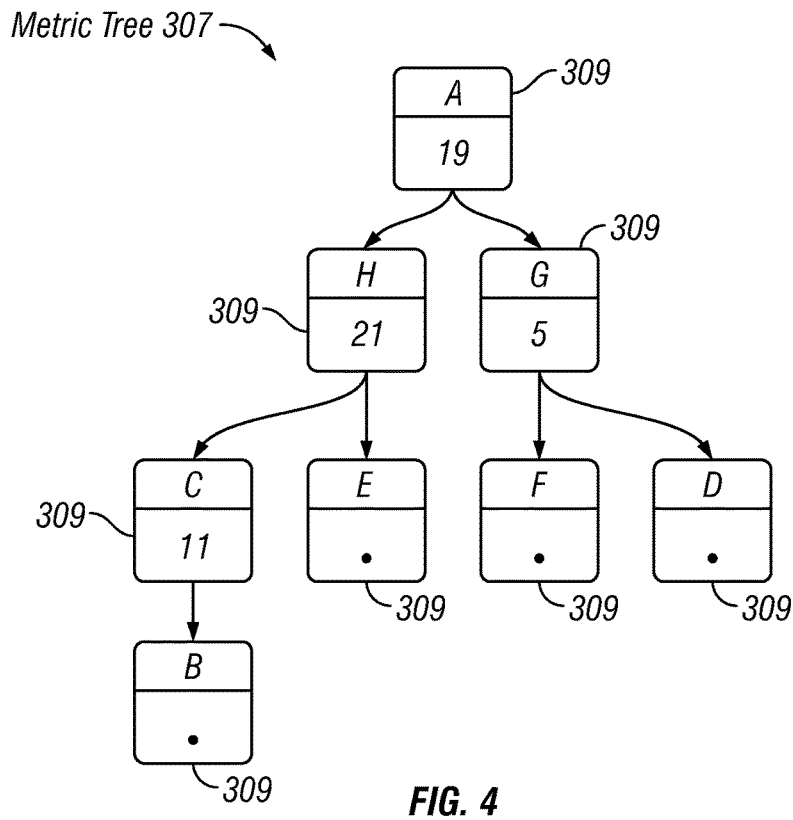
FIG. 4 is a tree diagram of a metric tree representing an organization of a sample dataset of known message threats, according to one embodiment.

To further clarify, FIG. 4 illustrates a metric tree 307 representing the organization of the example dataset 303 described above. Node A is the root of the tree 307, and has an edit distance of 19 (the median distance between the root and its children). Nodes B, C, E and H are placed on the branch to left of the root, and nodes D, F, and G on the branch to the right. On the left branch, node H is randomly chosen as the next base. Its three child nodes 309 are B, C and E, and the median of their distances from H is 21, as described above. Thus the edit distance to node H is 21, so nodes B and C are placed on the left branch from H, and E is placed to the right. E is the only node 309 on this right branch, so E becomes a childless leaf node 309 at level three of the metric tree 307. On the left branch from H, C is chosen as the base, so B becomes the only child of C, and thus B is a childless leaf at level four. The distance of node C's only child node B is 11 (i.e., there is an 11 bit difference between B and C), so 11 becomes the edit distance to node C. On the right branch at level two, node G is chosen as the base, its edit distance is 5, and it has two children, F on the left and D on the right, both childless leaves at level three.

Once a metric tree 307 storing the similarity hashes 305 of the dataset 303 of known message threats has been created as described above, incoming messages 302 (e.g., emails, text messages, etc.) can be checked against the members of the dataset 303 for similarity. To do so, a searching module 311 of the metric space similarity hash message threat detection system 101 searches the metric tree 307 to determine whether there exists a known message threat in the dataset 303 that is within a predetermined threshold level of similarity (as represented by a minimum distance in bits) to the message being tested. It is to be understood that the specific threshold to use is a variable design parameter, and different values can be used in different embodiments and under different circumstances as desired. In general, requiring a greater degree of similarity will yield fewer false positives but more false negatives, whereas using lower degrees of similarity as thresholds will yield more false positives but fewer false negatives. To clarify, the threshold can be thought of as a maximum distance between the message being evaluated and any known threat message, in order for the message being evaluated to be classified as a threat itself.

Suppose a message receiving module 313 of the of the metric space similarity hash message threat detection system 101 receives an incoming electronic message 302 which is unknown to the metric space similarity hash message threat detection system 101. In other words, it is not known whether the incoming message 302 is malicious or benign. Such an incoming electronic message 302 can be in the form of an email or a text or the like, originating from an external source (e.g., a remote computer 210). We will refer to this message of unknown status as message X. Suppose message X is in fact malicious, and is similar but not identical to message A of the dataset 303 depicted in Table 2. In the example of message X, the attacker has decided to modify the call-to-action URL, resulting in the following text: "Visit my webpage: http://shorener.com/501z to receive a free tablet". To test message X, a similarity hash calculating module 315 of the of the metric space similarity hash message threat detection system 101 calculates a similarity hash value 305 of the received message 302 to determine whether it is within the predetermined threshold of similarity to any known message threat in the dataset 303. Message X with the content given above generates the following binary similarity hash: 101101000111010100-0111010011001100010001110000001111000110111010.

Using an example threshold of 10% and an example hash length of 64 bits (other hash lengths can be used in other embodiments), the maximum distance the message could be from a member of the dataset 303 in order to be classified as a threat would be six bits. The value six bits is calculated as 10% of 64 (the hash length), rounded to the nearest integer. We will call this number the target distance. Thus, in our example where the similarity threshold is 10%, the target distance is 6.

Next, the searching module 311 traverses the metric tree 307 starting at the root node 309, to determine whether there is a node 309 therein that has a distance of no more than six bits from the similarity hash 305 of the message being evaluated. If so, the message being evaluated is sufficiently similar to a known message threat (i.e., is within the example similarity threshold of 10%), and thus is itself adjudicated as being a message threat. On the other hand, if there is not a node 309 in the tree 307 that has a distance of six bits or fewer from the test case, the message being evaluated is adjudicated as benign (i.e., it is not sufficiently similar to any known threat).

To traverse the tree 307 looking for a node 309 within the threshold of distance to the test case (i.e., the requisite distance to the test message), the searching module 311 first calculates the distance between the test case (message X) and the root of the tree 307 (node A). In this example, the distance between A and X is 10, which can be expressed as d(A, X)=10, where d(x, y) is the distance function. If the distance between the root node 309 and the test case was less than or equal to 6 it would not be necessary to look further, since in that case the root node 309 would be sufficiently similar. However, since this is not the case, the traversal of the tree 307 continues.

Next the searching module 311 determines whether to traverse the left branch and whether to traverse the right branch, looking for a node 309 that is sufficiently similar to message X. To determine whether to traverse the left branch, the searching module 311 subtracts the target distance from the distance between the test case and the root node 309. This step can be expressed as d(A, X)−target distance=remainder. In the current example this works out to 10−6=4, so the remainder is 4. If the remainder is less than or equal to the edit distance to the root node 309, the left branch of the tree 307 from the root node 309 is traversed looking for a node 309 that is sufficiently similar to X. This is in accordance with the principle of triangle inequality. In our example the remainder is 4 and the edit distance to node A is 19. Because 4<=19, the tree 307 is traversed to the left.

In addition to checking whether the left branch from the root node 309 is to be traversed, the same determination is made concerning the right branch. This is so because the distance between the test case and a node 309 can be within the target distance in either direction. The determination of whether to traverse to the right from the root node 309 is thus the counterpart of determining whether to traverse to the left, and is made by adding the target distance to distance between the test case and the root node 309. This step can be expressed as d(A, X)+target distance=sum. In the current example this works out to 10+6=16, so the sum is 16. If the sum is greater than our equal to the edit distance to the root node 309, the right branch of the tree 307 from the root node 309 is traversed looking for a node 309 that is sufficiently similar to X, in accordance with the principle of triangle inequality. In our example the sum is 16 and the edit distance to node A is 19. It is not the case that 16 is >=19, so the right branch is not traversed.

Because the traversal does continue to the left from the root node 309, the above described steps are repeated, starting at the left child of the root node 309 (the left child in our example is H), and treating that node 309 as the root. In other words, in our example the distance is now calculated between test case X and current compare node H, as d(H, X)=19. The distance of 19 between H and X is greater than the target distance 6 (i.e., H is not similar enough to X), so the searching module 311 determines whether to traverse from node H to the left and/or to the right. To determine whether to go left, the searching module 311 calculates distance (19)−target distance (6)=remainder (13), which is <=to the edit distance to H (21), so the traversal is continued down the left branch from H. To determine whether to traverse down the right branch, the searching module 311 calculates distance (19)+target distance (6)=sum (25), which is >=to the edit distance to H (21), so the traversal is continued down the right branch from H as well.

Traversing the left branch of the tree 307 from node H, node C (the left child of H) becomes the new compare node 309. Calculating the distance between test case X and current compare node C, which can be expressed as d(C, X), we get 6, which is equal to our target distance, meaning that node C is considered sufficiently similar (i.e., within 6 bits or 10%) to test message X. Thus, an adjudicating module 317 of the metric space similarity hash message threat detection system 101 adjudicates test message X as comprising a message threat, and the traversal of the metric tree 307 stops. In other words, because d(C,X)=6, no further traversal of the metric tree 307 need be performed, since a match that lies within the 10% range has been found. It is to be noted that traversal of the metric tree 307 is an n log(n) search, whereas pairwise comparison is linear. Using the metric tree 307 as described above eliminates the need to conduct a more computationally expensive pairwise comparison search. Instead, the searching module 311 completed its search after calculating only d(A,X), d(H,X) and d(C,X).

It is to be understood that in order to find a similarity match for test case X, the metric tree 307 is traversed recursively according to the steps described above until a node 309 is found within the requisite distance of the test case, or until the steps indicate that there are no further branches to be traversed.

In some embodiments, a smaller metric tree 307 is built based on the dataset 303, resulting in an even more efficient search process. As noted above, the metric space similarity hash message threat detection system 101 utilizes a metric tree 307 to efficiently locate an existing set member that is similar but not necessarily equal to a test case. Since a requisite level of similarity is close enough to be considered a match, the metric tree 307 can be approximate, meaning that the tree 307 can include just a subset of the dataset 303, the subset omitting members that are within a given threshold of similarity to a member already in the subset. Because the resulting metric tree 307 containing only the members of the subset has fewer nodes 309 than a tree 307 containing all the members of the full dataset 303, the smaller tree 307 requires fewer calculations to traverse. In other words, the metric tree building module 301 can build a metric tree 307 that contains only members that are a threshold distance (and thus level of difference) from each other, and such a tree 307 can be traversed looking for a similarity match more efficiently. Exactly how approximate to be when constructing a more efficient metric tree 307 can vary between embodiments.

In some embodiments, the similarity threshold can be divided between the level of member similarity to merit exclusion from a subset that forms a more efficient tree 307, and the target difference to search for when traversing the smaller tree 307. For example, assume a case in which the metric space similarity hash message threat detection system 101 seeks to detect a message that lies within 15 bits of the test case (24% in the case of 64 bit hashes). This threshold of 15 bits could be divided into 10 bits for the subset building process, and the remaining 5 bits for the search process. Using the example dataset 303 discussed above, member A could be selected as the base. The metric tree building module 301 then examines member B and calculates whether it is within 10 bits of A, in which case it need not be included in the subset since it is too similar to A. In other words, since the distance between A and B is 5 bits and 5 is less than 10, B is not included in the subset. The metric tree building module 301 moves on to the next candidate C, which is 10 bits from A. Once again, this is within the threshold (10 bits), so C is excluded from the subset as well.

Figure 5:
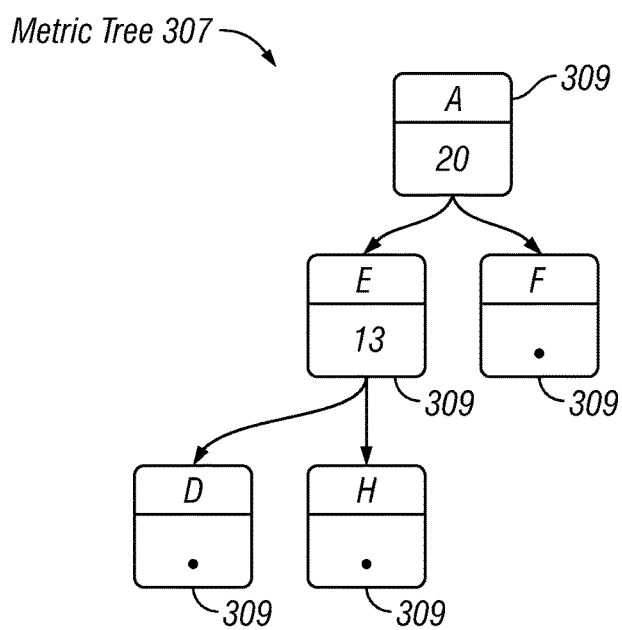
FIG. 5 is a tree diagram of a smaller metric tree representing an organization of a sample subset of known message threats, according to one embodiment.

Member D is examined next. Since the distance between A and D is greater than 10 bits, D is added to the subset. The next member to be examined is E. The metric tree building module 301 calculates distances from E to all members which are in the subset, which now includes A and D. The distance of E from A is 19 bits and from D is 13 bits. Since E is more than 10 bits from each member of the subset, E is added. The metric tree building module 301 next examines F, and calculates its distance to A (21), D (22), and E (18). All of these distances are greater than the threshold value of 10 bits, so the metric tree building module 301 adds F to the subset. G is examined, and its distances to the existing subset members are calculated: A (23), D (19), E (20) and F (5). Since G is only 5 bits away from F, it is not added to the subset. Finally, H is examined. The metric tree building module 301 calculates H's distance to A (19), to D (23), to E (23) and to F (21). All of these results are greater than 10 bits, so H is added. This preprocessing to create a subset is computationally intensive, however it results in a much smaller metric tree 307, so subsequent searching of the tree 307 is more efficient. It is to be understood that the specific thresholds and divisions thereof between subset creation and searching can vary between embodiments as desired. The above example could result in the metric tree 307 illustrated in FIG. 5. The procedure for searching a smaller metric tree 307 based on a subset is the same as for searching a full metric tree 307 as described above. Because spammers and other propagators of message threats tend to produce many (e.g., thousands) of similar messages, the above described approach to building subset based metric trees 307 that include only sufficiently distinct samples can save significant memory space and computations. In some embodiments, the resulting smaller metric trees 307 can be stored on client-side devices with limited computational capability and/or storage (e.g., smart phones and tablets).

In some embodiments, the metric space similarity hash message threat detection system 101 creates multiple metric trees 307 representing the same dataset 303, where the nodes 309 of each separate tree 307 are created using a different similarity hashing algorithm. In such embodiments, the adjudication of test cases as malicious or benign can be fine-tuned based on results of searches in different trees 307, so as to lower the rate of false negatives and false positives. Put another way, by applying different similarity hashing algorithms to the messages of the dataset 303 of known threats, different hash values 305 for each known message threat are created. The hashes 305 created according to the different hashing algorithms are used to create different metric trees 307, each metric tree 307 being a different representation of the same dataset 303. The multiple metric trees 307 can then be searched in parallel for the test case, the hash value 305 of which is in each case created using the same similarity hashing algorithm as the corresponding tree 307. The specific number of metric trees 307 to create and how specifically to adjudicate messages based on the results of searching the multiple trees 307 can vary between embodiments. For example, in an embodiment in which two different metric trees 307 are used, a sample could be adjudicated as being of status unknown if searches of the two trees 307 yield different verdicts, and as either benign or malicious if the two trees 307 yield the same result. The number of verdict trees 307 can be adjusted as desired to fine-tune the elimination possible adjudication errors.

The above described functionality of the metric space similarity hash message threat detection system 101 works very well for messages written in alphabetic languages, such as English, French or German. The case of messages written in character based languages such as Chinese or Japanese, which are typically represented electronically using Universal Character Set 8-bit Transformation Format ("UTF-8") is now addressed. When applying the above-described functionality to UTF-8 character set messages in Japanese or Chinese languages, low entropy is encountered in the generated similarity hashes 305. This problem is caused by the fact that UTF-8 uses multi-byte encodings, in which a large majority of bits remain constant for a given language. To illustrate this problem, Table 4 depicts the text of three Japanese messages that have completely different meanings, and the similarity hashes 305 of these messages.

TABLE 4

| ID | Original Message | Similarity Hash |
|---|---|---|
| A | 残り10分...でも5分あれば1分です! どうか今すぐ【本人同意】と「言」してはドさいませんか?それで「開」始が計求る | 0110011111001010010111001 1011111001000000100101100 1001000101010 |
| B | 何度も連絡てすみませんでした。智子という女性が明日「泉」さんを紹介してくれるとの事になりました。ありがとうございました。これでやつ? | 0110011101001110010111001 1011110100100001010010100 1011000101110 |
| C | 振り込み如くにしまかもね?出来るだけサイトは | 0110011101011110010111011 1011110110100001010010100 1001000101010 |

Although messages A, B and C each contain completely different content, their similarity hashes 305 are very close. Looking at Table 5, we see the distances in bits between Japanese messages A, B and C. Although the messages themselves are very different, the distance between the similarity hashes 305 is small, within 8-12%. This is well within the scope of a threshold value that could be used in some embodiments to classify the messages as being substantially similar, when in fact they are not.

TABLE 5

|   | B | C |
|---|---|---|
| A | 7 | 8 |
| B |   | 5 |

To address this problem, in some embodiments a text Romanization module 319 of the metric space similarity hash message threat detection system 101 Romanizes messages that are in non-alphabetic languages. To do so, the Romanization module 319 converts the messages from UTF-8 to the Latin alphabet using the American Standard Code for Information Interchange character-encoding scheme (ASCII). Similarity hashes 305 of the resulting standard ASCII text are then taken. Table 6 depicts the results of Romanizing the Japanese messages from Table 4.

TABLE 6

| ID | Romanized Message | Similarity Hash |
|---|---|---|
| A | Can ri10Fen ...demo5Fen arebaShi Fen desu!!doukaJin sugu[(Ben Ren Tong Yi )] to1Yan Yang tsutehaXia saimasenka?soredeWu Liao Kai Shi gaChu Lai ru | 0011010101001111 1001110101111100 0101100110101011 1111110111111001 |
| B | He Du moLian Luo shitesumimasendeshita. Zhi Zi toiuNu Xing gaMing Ri [Quan ] sanwoShao Jie shitekurerutonoShi ninarimashita. arigatougozaimashita. koredeyatsu? | 0000000111101100 1011100100011110 0101100000100011 1100110011110001 |
| C | Zhen riIp mihaZhi gunishimasukarane?Chu Lai rudakesaitoha | 0011111111111111 1011110110011111 1101110100100001 1101110001100011 |

This transformation results in differencing the distance between the similarity hashes 305 of the messages significantly enough for use with the above-described metric space similarity hash message threat detection system 101 based functionality. The corresponding distances between the similarity hashes 305 of the Romanized messages are depicted in Table 7. As can be seen, these distances are much greater than those between the UTF-8 text, and more accurately reflect the differences between the originating Japanese language messages.

It is to be understood that in some embodiments, the originating character based messages can be encoded using a scheme other than UTF-8 (e.g., UTF-16, UTF-32, GB 2312, etc.). Likewise, the originating messages can be converted into an encoding of the Latin alphabet other than standard ASCII (e.g., Windows-1252, CP-1252, extended ASCII, EBCDIC, etc.). In some embodiments, the character based messages are converted into an encoding of an alphabet other than the Latin, for example Cyrillic or Greek.

TABLE 7

|   | B | C |
|---|---|---|
| A | 19 | 21 |
| B |    | 19 |

In some embodiments, a tree recalculation module 321 of the metric space similarity hash message threat detection system 101 operates on copies of the production metric tree(s) 307, and makes improvements and updates. More specifically, this component can calculate optimal metrics for the dataset 303 in use, perform more efficient tree 307 recalculations, add new members and/or remove stale members to/from the dataset 303 and rebuild the tree(s) 307 accordingly, etc. In FIG. 3, the tree recalculation module 321 is illustrated as residing on a separate computer 210 from the other modules of the metric space similarity hash message threat detection system 101. The purpose for this arrangement would be to run the recalculation functionality on a faster computer, and push the resulting updates to the server 105 on which the rest of the metric space similarity hash message threat detection system 101 runs. In other embodiments, the tree recalculation module 321 can reside on the same computer 210 as the other modules. In either case, the updated/recalculated metric trees 307 can be synchronized with the production tree(s) 307 as updates are available.

The metric space similarity hash message threat detection system 101 enables detection of spam and other message threats based on the entire structure of the messages, rather than by looking at individual words, phrases or calls-to-action which are often modified. By using similarity hashes 305, the metric space similarity hash message threat detection system 101 can detect messages within a predetermined threshold of similarity to known threats, so the messages need not be exact matches. Furthermore, the metric space similarity hash message threat detection system 101 is content and language agnostic, looking instead for similarity to given patterns. Conventional attempts to use similarity hashes 305 for message threat detection have required pairwise comparison to determine if a message being evaluated is similar but not an exact match to a known threat. Pairwise comparison is simply too slow and computationally expensive to be viable for real-time message evaluation against a large dataset 303. By contrast, the metric space similarity hash message threat detection system 101 detects variations of messages in an efficient way, by implementing trees 307 representing metric distance. This is efficient as it is based on operations on bits, and enables determination of whether a test message is within a customized similarity threshold to a known message threat. These determinations are fast and computing resource efficient enough to be used in commercial electronic message filtering systems (e.g., email, SMS) to detect incoming message threats.

Although the above description describes the metric space similarity hash message threat detection system 101 operating in the field of message threat detection, this functionality can also be applied in other areas, such as finding indicators of compromise (IOC) in memory dumps of suspected malware samples, to find resemblances (similarity) to those of known existing malware.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for detecting electronic messaging threats by using metric trees and similarity hashes, the method comprising: maintaining, by a computer, a metric tree comprising a plurality of nodes, each node comprising a similarity hash value of a member of a dataset of known electronic message threats, each similarity hash value calculated using a specific similarity hashing algorithm, wherein the plurality of nodes are organized as the metric tree with differences between the similarity hash values represented as distances between the nodes; receiving, by the computer, an electronic message, wherein a status of the received electronic message as being benign or malicious is not known; calculating a similarity hash value of the received electronic message, by the computer, wherein the similarity hash value of the received electronic message is calculated using the specific similarity hashing algorithm that is used to calculate the similarity hash values of the members of the dataset of known electronic message threats; searching the metric tree, by the computer, for a similarity hash value of a known electronic message threat within a predetermined threshold of distance to the similarity hash value of the received electronic message: comprising: traversing the metric tree starting at its root node, to determine whether there is a specific node within the metric tree that has a distance of no more than the predetermined threshold to the similarity hash value of the received electronic message, comprising: until 1) a specific node within the metric tree that has a distance of no more than the predetermined threshold to the similarity hash value of the received electronic message is found, or 2) there are no further branches of the metric tree to be traversed: calculating a distance between a compare node and the similarity hash value of the received electronic message, wherein on a first pass the compare node comprises the root node of the metric tree; determining whether to traverse a left branch of the compare node, by calculating a remainder from subtracting the predetermined distance threshold from the distance between the compare node and the similarity hash value of the received electronic message, and only in response to the remainder being less than or equal to an edit distance to the compare node, determining to traverse the left branch of the compare node; determining whether to traverse a right branch of the compare node, by calculating a sum from adding the predetermined distance threshold to the distance between the compare node and the similarity hash value of the received electronic message, and only in response to the sum being greater than or equal to an edit distance to the compare node, determining to traverse the right branch of the compare node; and setting the compare node to a root node of a branch to be traversed; and responsive to results of the searching, adjudicating the received electronic message as being benign or malicious, by the computer.

2. The method of claim 1 wherein adjudicating the received electronic message as being benign or malicious responsive to results of the searching further comprises:
adjudicating the received electronic message as being malicious, responsive to finding a similarity hash value of a known electronic message threat within the predetermined threshold of distance to the similarity hash value of the received electronic message.

3. The method of claim 1 wherein adjudicating the received electronic message as being benign or malicious responsive to results of the searching further comprises:
adjudicating the received electronic message as being benign, responsive to not finding a similarity hash value of a known electronic message threat within the predetermined threshold of distance to the similarity hash value of the received electronic message.

4. The method of claim 1 wherein:
the similarity hash values further comprise binary values.

5. The method of claim 1 further comprising:
receiving an electronic message in a non-alphabetic, character based language, wherein the status of the received electronic message as being benign or malicious is not known; and
prior to calculating a similarity hash value of the received electronic message, converting text of the received electronic message into an alphabetic language.

6. The method of claim 1 further comprising:
periodically updating the metric tree to reflect at least one optimization.

7. The method of claim 1 further comprising:
periodically updating the metric tree to reflect changes to the dataset of known electronic message threats.

8. The method of claim 1 further comprising:
creating a subset of the members of the dataset of known electronic message threats, wherein the subset only includes members that are outside of a given threshold of similarity to each other; and
building the metric tree based on the subset.

9. At least one non-transitory computer readable medium for detecting electronic messaging threats by using metric trees and similarity hashes, the at least one non-transitory computer readable medium storing computer executable instructions that, when loaded into computer memory and executed by at least one processor of at least one computing device, cause the at least one computing device to perform the following steps: maintaining a metric tree comprising a plurality of nodes, each node comprising a similarity hash value of a member of a dataset of known electronic message threats, each similarity hash value calculated using a specific similarity hashing algorithm, wherein the plurality of nodes are organized as the metric tree with differences between the similarity hash values represented as distances between the nodes; receiving an electronic message, wherein a status of the received electronic message as being benign or malicious is not known; calculating a similarity hash value of the received electronic message wherein the similarity hash value of the received electronic message is calculated using the specific similarity hashing algorithm that is used to calculate the similarity hash values of the members of the dataset of known electronic message threats; searching the metric tree for a similarity hash value of a known electronic message threat within a predetermined threshold of distance to the similarity hash value of the received electronic message: comprising: traversing the metric tree starting at its root node, to determine whether there is a specific node within the metric tree that has a distance of no more than the predetermined threshold to the similarity hash value of the received electronic message, comprising: until 1) a specific node within the metric tree that has a distance of no more than the predetermined threshold to the similarity hash value of the received electronic message is found, or 2) there are no further branches of the metric tree to be traversed: calculating a distance between a compare node and the similarity hash value of the received electronic message, wherein on a first pass the compare node comprises the root node of the metric tree; determining whether to traverse a left branch of the compare node, by calculating a remainder from subtracting the predetermined distance threshold from the distance between the compare node and the similarity hash value of the received electronic message, and only in response to the remainder being less than or equal to an edit distance to the compare node, determining to traverse the left branch of the compare node; determining whether to traverse a right branch of the compare node, by calculating a sum from adding the predetermined distance threshold to the distance between the compare node and the similarity hash value of the received electronic message, and only in response to the sum being greater than or equal to an edit distance to the compare node, determining to traverse the right branch of the compare node; and setting the compare node to a root node of a branch to be traversed; and responsive to results of the searching, adjudicating the received electronic message as being benign or malicious.

10. The at least one non-transitory computer readable medium of claim 9 further storing computer executable instructions for:

adjudicating the received electronic message as being malicious, responsive to finding a similarity hash value of a known electronic message threat within the predetermined threshold of distance to the similarity hash value of the received electronic message.

11. The at least one non-transitory computer readable medium of claim 9 further storing computer executable instructions for:
adjudicating the received electronic message as being benign, responsive to not finding a similarity hash value of a known electronic message threat within the predetermined threshold of distance to the similarity hash value of the received electronic message.

12. The at least one non-transitory computer readable medium of claim 9 further storing computer executable instructions for building the metric tree by:
calculating a similarity hash value of each member of the dataset of known electronic message threats, using the specific similarity hashing algorithm;
treating each calculated similarity hash value as a node of the metric tree;
until each one of the nodes has been assigned to a specific position in the metric tree:
assigning one of the nodes to be a current base node, wherein on the first pass the current base node is positioned as the root node of the metric tree and on each subsequent pass the base node is positioned as a child node of the previous base node, on a left branch from the previous base node, on a right branch from the previous base node or as the only child node of the previous base node;
determining a distance between the current base node and each node to be positioned under the current base node;
determining a median distance from the current base node to each node to be positioned under the current base node;
setting the determined median distance as the edit distance to the current base node;
positioning any nodes to be positioned under the current base node with a distance to the current base node that is less than or equal to the median distance on a left branch from the current base node;
positioning any nodes to be positioned under the current base node with a distance to the current base node that is greater than the median distance on a right branch from the current base node; and
selecting a new current base node for any branch from the current base node on which more than one node is positioned.

13. The at least one non-transitory computer readable medium of claim 9 wherein:
the similarity hash values further comprise binary values.

14. The at least one non-transitory computer readable medium of claim 9 further storing computer executable instructions for:
receiving an electronic message in a non-alphabetic, character based language, wherein the status of the received electronic message as being benign or malicious is not known; and
prior to calculating a similarity hash value of the received electronic message, converting text of the received electronic message into an alphabetic language.

15. The at least one non-transitory computer readable medium of claim 9 further storing computer executable instructions for:
periodically updating the metric tree to reflect at least one optimization.

16. The at least one non-transitory computer readable medium of claim 9 further storing computer executable instructions for:
periodically updating the metric tree to reflect changes to the dataset of known electronic message threats.

17. A computer system for detecting electronic messaging threats by using metric trees and similarity hashes, the computer system comprising: a processor; system memory; a metric tree maintaining module residing in the system memory, the metric tree maintaining module being programmed to maintain a metric tree comprising a plurality of nodes, each node comprising a similarity hash value of a member of a dataset of known electronic message threats, each similarity hash value calculated using a specific similarity hashing algorithm, wherein the plurality of nodes are organized as the metric tree with differences between the similarity hash values represented as distances between the nodes; a message receiving module residing in the system memory, the message receiving module being programmed to receive an electronic message, wherein a status of the received electronic message as being benign or malicious is not known; a similarity hash calculating module residing in the system memory, the similarity hash calculating module being programmed to calculate a similarity hash value of the received electronic message wherein the similarity hash value of the received electronic message is calculated using the specific similarity hashing algorithm that is used to calculate the similarity hash values of the members of the dataset of known electronic message threats; a searching module residing in the system memory, the searching module being programmed to search the metric tree for a similarity hash value of a known electronic message threat within a predetermined threshold of distance to the similarity hash value of the received electronic message: comprising: traversing the metric tree starting at its root node, to determine whether there is a specific node within the metric tree that has a distance of no more than the predetermined threshold to the similarity hash value of the received electronic message, comprising: until 1) a specific node within the metric tree that has a distance of no more than the predetermined threshold to the similarity hash value of the received electronic message is found, or 2) there are no further branches of the metric tree to be traversed: calculating a distance between a compare node and the similarity hash value of the received electronic message, wherein on a first pass the compare node comprises the root node of the metric tree; determining whether to traverse a left branch of the compare node, by calculating a remainder from subtracting the predetermined distance threshold from the distance between the compare node and the similarity hash value of the received electronic message, and only in response to the remainder being less than or equal to an edit distance to the compare node, determining to traverse the left branch of the compare node; determining whether to traverse a right branch of the compare node, by calculating a sum from adding the predetermined distance threshold to the distance between the compare node and the similarity hash value of the received electronic message, and only in response to the sum being greater than or equal to an edit distance to the compare node, determining to traverse the right branch of the compare node; and setting the compare node to a root node of a branch to be traversed; and an adjudicating module residing in the system memory, the adjudicating module being programmed to adjudicate the received electronic message as being benign or malicious, responsive to results of the searching.

18. A computer implemented method for detecting electronic messaging threats by using metric trees and similarity hashes, the method comprising: maintaining, by a computer, a plurality of metric trees, wherein each different metric tree comprises a separate plurality of nodes, each node of a given plurality comprising a similarity hash value of a member of a dataset of known electronic message threats, each similarity hash value of the given plurality being calculated using a specific similarity hashing algorithm, wherein each separate plurality of nodes is organized as a corresponding metric tree with differences between the similarity hash values represented as distances between the node, wherein each different metric tree contains similarity hash values of the members of the dataset of known electronic message threats calculated using a different similarity hashing algorithm associated with the given one of the plurality of metric trees; receiving, by the computer, an electronic message, wherein a status of the received electronic message as being benign or malicious is not known; for each different given one of the plurality of metric trees, calculating a similarity hash value of the received electronic message, using the specific similarity hashing algorithm that is used to calculate the similarity hash values of the members of the dataset of known electronic message threats for the given one of the plurality of metric trees, wherein the similarity hash value of the received electronic message for the given one of the plurality of metric trees is calculated using the different similarity hashing algorithm associated with the given one of the plurality of metric trees; searching each different given one of the plurality of metric trees for a similarity hash value of a known electronic message threat within a predetermined threshold of distance to the similarity hash value of the received electronic message calculated for the given one of the plurality of metric trees; and responsive to results of the searching, adjudicating the received electronic message as being benign or malicious, by the computer.

19. A computer implemented method for detecting electronic messaging threats by using metric trees and similarity hashes, the method comprising: building a metric tree using a computer by: calculating a similarity hash value of each member of a dataset of known electronic message threats using a specific similarity hashing algorithm; treating each calculated similarity hash value as a node of the metric tree; until each one of the nodes has been assigned to a specific position in the metric tree: assigning one of the nodes to be a current base node, wherein on a first pass the current base node is positioned as a root node of the metric tree and on each subsequent pass the base node is positioned as a child node of the previous base node, on a left branch from the previous base node, on a right branch from the previous base node or as the only child node of the previous base node; determining a distance between the current base node and each node to be positioned under the current base node; determining a median distance from the current base node to each node to be positioned under the current base node; setting the determined median distance as the edit distance to the current base node; positioning any nodes to be positioned under the current base node with a distance to the current base node that is less than or equal to the median distance on a left branch from the current base node; positioning any nodes to be positioned under the current base node with a distance to the current base node that is greater than the median distance on a right branch from the current base node; and selecting a new current base node for any branch from the current base node on which more than one node is positioned; maintaining, by the computer, the metric tree comprising a plurality of nodes, each node comprising a similarity hash value of a member of a dataset of known electronic message threats, each similarity hash value calculated using the specific similarity hashing algorithm, wherein the plurality of nodes are organized as the metric tree with differences between the similarity hash values represented as distances between the nodes; receiving, by the computer, an electronic message, wherein a status of the received electronic message as being benign or malicious is not known; calculating a similarity hash value of the received electronic message, by the computer, wherein the similarity hash value of the received electronic message is calculated using the specific similarity hashing algorithm that is used to calculate the similarity hash values of the members of the dataset of known electronic message threats; searching the metric tree, by the computer, for a similarity hash value of a known electronic message threat within a predetermined threshold of distance to the similarity hash value of the received electronic message; and responsive to results of the searching, adjudicating the received electronic message as being benign or malicious, by the computer.

20. The method of claim 19 wherein at least one known electronic message threat is in a non-alphabetic, character based language, the method further comprising:
prior to calculating a similarity hash value of the at least one known electronic message threat that is in a non-alphabetic, character based language, converting text of the at least one known electronic message threat into an alphabetic language.

\* \* \* \* \*